Jan. 16, 1923.

J. WHITAKER.
FENDER FOR VEHICLES.
FILED MAY 21, 1921.

Inventor:
James Whitaker
by Arthur T. Randall
Atty.

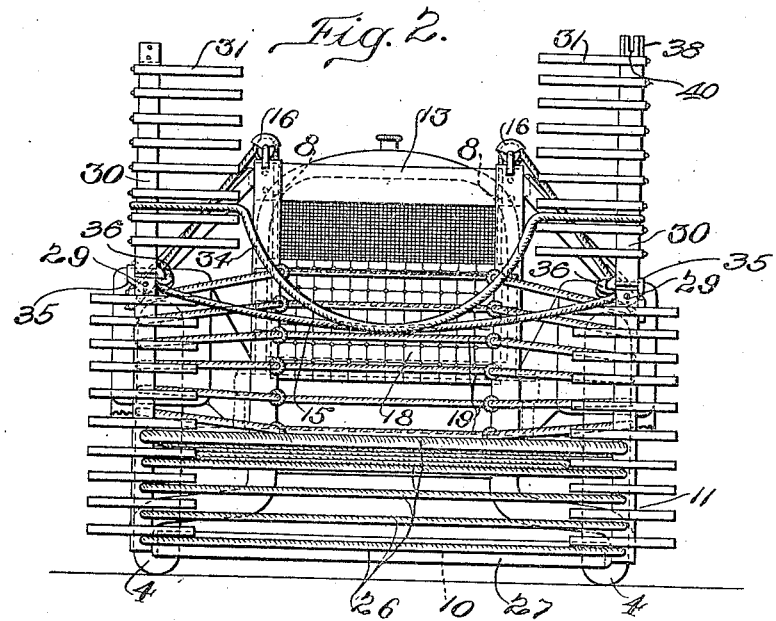
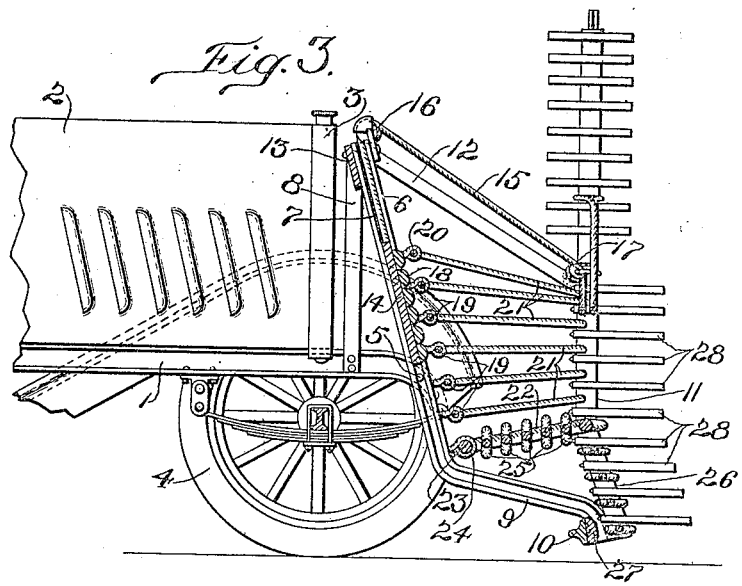

Patented Jan. 16, 1923.

1,442,546

UNITED STATES PATENT OFFICE.

JAMES WHITAKER, OF BOSTON, MASSACHUSETTS, ASSIGNOR OF ONE-HALF TO SAMUEL L. ASSNER, OF BOSTON, MASSACHUSETTS.

FENDER FOR VEHICLES.

Application filed May 21, 1921. Serial No. 471,310.

*To all whom it may concern:*

Be it known that I, JAMES WHITAKER, a citizen of the United States, and resident of Boston, in the county of Suffolk and State of Massachusetts, have invented certain new and useful Improvements in Fenders for Vehicles, of which the following is a specification.

My invention relates to fenders for vehicles, particularly automobiles and the like, and it has for its object to provide an improved fender of this class of simple and efficient construction.

My improved fender as herein shown comprises a frame constructed with a seat or shelf extending across the front end of the vehicle a short distance above the ground adapted to receive upon it the body of a person that is struck by the fender, and a feature of the invention consists in providing the fender with an extensible back wall that is normally contracted and that normally occupies a relatively low inoperative, or partially inoperative, position, means being provided through which the body of the person struck by the vehicle acts to automatically extend said back wall upwardly so as to interpose said wall between the front end of the car and the body of the person. Another feature of the invention consists in providing the fender with two side walls, one at each end of the seat, each wall comprising an upright yielding or resilient buffer that acts to deflect a body struck thereby so that it is either directed onto said seat or thrown to one side out of the path of the vehicle.

Other features of my invention are hereinafter pointed out.

In the accompanying drawings:

Figure 2 is a front elevation of the parts shown in Fig. 1.

Figure 3 is a section on line 3—3 of Fig. 1.

Figure 4 is a detail of the gates hereinafter referred to.

Figure 1:
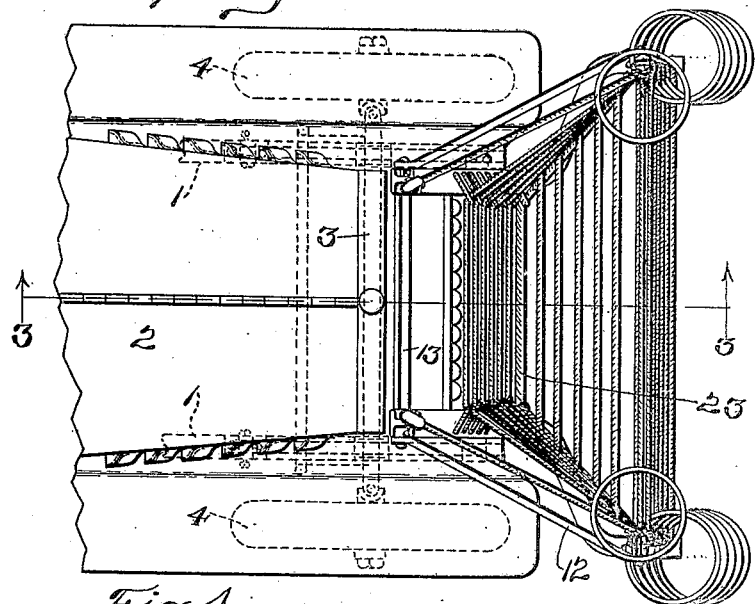
Figure 1 is a plan view of the forward end of an automobile equipped with a fender constructed in accordance with my invention.
Figure 4:
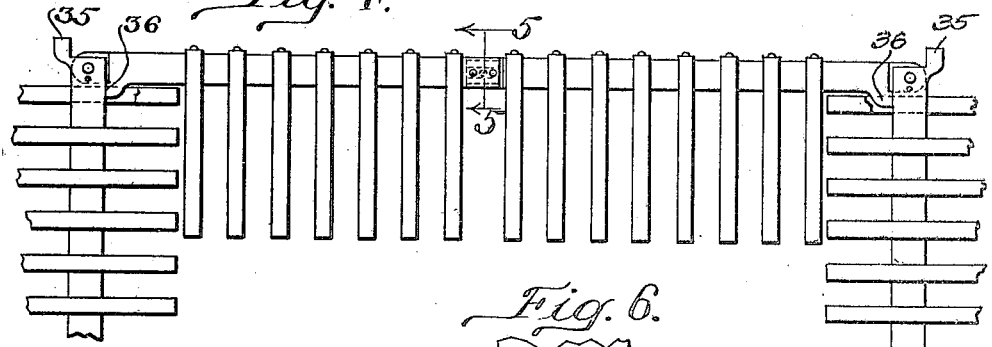

Having reference to the accompanying drawings, 1, 1, represent the forward end portions of the side bars of the chassis or frame of an automobile, 2 the hood, 3 the radiator, and 4, 4, the front wheels. To each side bar 1 is bolted, as at 5, an upright bar 6 of I-beam shape in cross-section which provides a longitudinal groove 7 upon the inner side thereof. Near its upper end each side bar 6 has bolted or otherwise secured to it, the upper end of a rigid brace bar or strut 8 whose lower end is bolted to the adjacent side bar 1 of the frame. These two bars serve to hold the side bars 6 rigidly in position. The lower end portions of the side bars 6 extend forwardly for a short distance and their forward ends are connected by a cross-bar 10 fastened at its ends to said forward extensions 9, said cross-bar 10 serving to hold the lower ends of the uprights 6 against relative displacement sidewise. Each extension 9 also has rigidly fastened to its forward end, the lower end of a post 11 whose upper end is rigidly connected by an arm or strut 12 with the upper end of the adjacent side bar 6. The upper ends of the side bars 6 are connected by a top cross-bar 13 which serves to hold said ends against relative displacement sidewise. The bars 6, 9, 10, 11, 12 and 13 are bolted or otherwise rigidly secured together and make up the frame of my improved fender, said frame being adapted to be attached to the forward end of the frame or chassis of an automobile of ordinary or standard make.

Slidably mounted at its ends in the grooves 7 of uprights 6 is a back board 14 to which are fastened the ends of a length of flexible rope 15. One end of rope 15 is fastened to back board 14 near one end thereof and extends upwardly around a sheave 16 supported by a bracket secured to the upper end of one of the uprights 6, and thence forwardly around another sheave 17 mounted upon the upper end of the post 11 at that side of the fender. From sheave 17 the rope 15 extends across the front of the fender to and around another sheave 17 secured to the upper end of the post 11 at the opposite side of the fender, and thence rearwardly around another sheave 16 mounted upon a bracket secured to the upper end of the other upright 6. From this second sheave 16 the rope 15 extends downwardly to the back board 14 to which it is secured. The two stretches of rope 15 which extend from sheaves 16 to back board 14 are within the grooves 7 of uprights 6 as indicated by dotted lines in Fig. 2. As shown in Figs. 2 and 3 the front side of back board 14 is covered with padding 18 to prevent injury to a body that strikes against the same.

The back board 14 constitutes the upper section of the back wall of the fender, the lower section thereof being made up of a plurality of transverse ropes 19 extending through rope eyes 20 secured to uprights 6. From the eyes 20 stretches 21 of ropes 19 extend forward at each side of the fender to the uprights 11 to which the ends of said stretches are fastened. Thus the middle portions 19 of these ropes constitute a yielding or resilient lower back wall-section for the fender, while the end portions 21 thereof provide resilient or yielding side walls for the fender.

At each side of the fender, below the back ropes 19, there is provided a stretch of rope 22 fastened at its forward end to the adjacent upright 11, said two stretches being the end portions of a length of rope 23 that extends through rope eyes 24 secured to the uprights 6. These two stretches 22 have fastened to them the ends of a plurality of transverse ropes 25 which constitute a resilient or yielding seat or body support adapted to receive upon it the body of a person struck by the fender, and in order to prevent the body, or legs thereof, from passing under the seat, I provide the latter with a skirt or depending wall at the front thereof, made up of a plurality of transverse ropes 26, said wall or skirt extending from the seat nearly to the ground. These ropes 26 are fastened at their ends to the uprights 11.

In order to avoid possible injury to a body striking against the fender and against cross-bar 10, the front side of the latter is padded as at 27.

Each side bar 11 has secured to it a series of metal hoops 28 of thin tempered strips of sheet metal, said bar extending through its series of hoops with each of the latter projecting forward beyond the post or upright 11 so as to act as a buffer.

Also, when a body comes into contact with either series of hoops the latter tend to swing either inwardly or outwardly thereby deflecting the body onto the fender or throwing it aside out of the path of the vehicle.

Normally the back board 14 occupies its lowermost position behind the ropes 19 so that the upper portion of the radiator 3 is uncovered. When, however, the fender strikes against a person the latter's body strikes against the transverse middle portion of the rope 15 and acts through the latter to raise the back board 14 into a position near the upper ends of uprights 6 so that it is automatically interposed between the body and the upper portion of the radiator there- by shielding the body from contact with said radiator.

It will be clear from the foregoing that a body struck by the fender will either be thrown aside out of the path of the vehicle by the resilient buffer hoops 28, or will be thrown upon the fender against the upper padded wall section 14 and the lower yielding wall section made up of ropes 19.

Pivotally connected at 29 to the upper end of each forward post 11 is a gate or arm 30 provided with buffer hoops 31 like the hoops 28 of posts 11, said gate being normally and yieldingly held elevated in an upright position by a spring pressed latch 32 mounted in the post 11 and co-operating with a notch or socket 33 formed in the hub portion of the gate 30. To these two arms 30 are fastened the ends of a rope 34 which extends across the front of the fender alongside of the rope 15. When a body falls into the fender it engages rope 34 and acts through the latter to swing the two arms 30 downwardly and inwardly into horizontal positions thus closing the front of the fender and preventing the body from rebounding forwardly out of the fender. These arms or gates 30 are manually restored to their upright positions and stops 35 on posts 11 engage the sides of said gates when thus returned to their normal positions, to prevent outward movement of each beyond its upright position. Stops 36 on the gates 30 engage the sides of the posts 11 to limit the inward swinging movement of each gate and support the latter in horizontal position.

Figure 5:
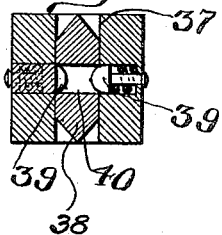
Figure 5 is a section on line 5—5 of Fig. 4.
Figure 6:
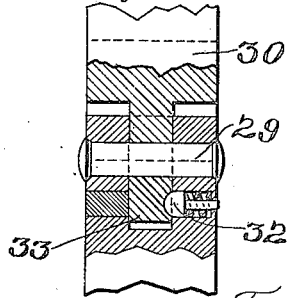
Figure 6 is a detail hereinafter described.

In order to catch and hold the gates 30 in their horizontal positions when thrown downwardly as described, the free end of one gate is slotted as at 37, Fig. 5, to receive the reduced or thinned end portion 38 of the other gate when said ends are brought together. Spring pressed latches 39 mounted in sockets formed in one of said gates engage in a slot 40 formed in the other gate, to yieldingly lock the two arms together when swung down into their closed positions.

What I claim is:

1. A fender for vehicles having, in combination, a frame for attachment to the vehicle; a horizontal body support; a normally contracted extensible back wall movable independently of said body support and disposed at the rear of the latter, and automatic means for extending said back wall when a body is struck by the fender.

2. A fender for vehicles having, in combination, a frame for attachment to the vehicle; a horizontal body support; a normally contracted extensible back wall movable independently of said body support and disposed at the rear of the later, and means through which a body that is struck by the fender acts to extend said back wall upwardly so as to interpose said wall between the body and the end of the vehicle.

3. A fender for vehicles having, in combination, a frame for attachment to the vehicle; a horizontal body support; a normally contracted extensible back wall at the rear of said body support comprising a section that is movably mounted upon said frame and normally occupies a relatively low position, and a member extending across the front of the fender and adapted to be operated by a body that is struck by the fender to shift said section upwardly into an operative position.

4. A fender for vehicles having in combination, a frame for attachment to a vehicle; a horizontal body support; a back wall section mounted upon said frame to move independently of said body support and normally occupying a relatively low position, and a member extending across the front of the fender and adapted to be operated by a body that is struck by the fender to shift said section upwardly into its operative position.

5. A fender for vehicles having in combination, a frame for attachment to the vehicle; a horizontal body support on said frame; two posts, one at each side of said support, and forwardly projecting eccentrically disposed spring buffer hoops on said posts for shielding a body from the latter and deflecting said body sidewise.

6. A fender for vehicles having in combination, a frame for atachment to the vehicle; a horizontal body support on said frame; two posts on said frame, one at each side of said support, and forwardly projecting spring buffer hoops secured to said posts for deflecting a body sidewise, either onto the fender or out of the path of the vehicle.

7. A fender for vehicles having in combination, a frame for attachment to the vehicle; a horizontal body support on said frame; a back wall at the rear of said body support made up of ropes secured to said frame and extending transversely thereof, and side walls, one at each side of said body support, constituted by the end portions of said ropes.

8. A fender for vehicles having in combination, a frame for attachment to the vehicle comprising two pairs of uprights, one of said pairs being near the front of the fender and the other pair near the rear thereof; a horizontal body support on said frame; a back wall at the rear of said body support made up of ropes extending transversely of said frame, and side walls, one at each side of said body support, said side walls being constituted by the end portions of said ropes and said end portions being fastened to said uprights.

9. A fender for vehicles having in combination, a frame for attachment to the vehicle; a horizontal body support on said frame; an upstanding back wall near the rear of said body support; a pair of gates at opposite sides of the fender, each gate being pivotally mounted on said frame to move up and down; means normally holding the gates in elevated positions, and means adapted to be engaged by a body that is struck by the fender through which said body acts to positively move said gates downwardly into their closed positions as it enters upon said body support.

10. A fender for vehicles having, in combination, a frame for attachment to the vehicle including two upright side posts each comprising a lower fixed section and an upper movable gate section pivotally connected with the lower section so as to swing up and down crosswise of the vehicle; means yieldingly supporting each upper gate section in upstanding position; a horizontal body support on said frame; an upstanding back wall near the rear of said body support, and means through which a body that is struck by the fender positively acts to swing said upper gate sections downwardly and inwardly to cause them to confine said body in its position upon the body support.

In testimony whereof I have affixed my signature.

JAMES WHITAKER.